United States Patent [19]
Sovitski

[11] Patent Number: 5,873,505
[45] Date of Patent: Feb. 23, 1999

[54] COMBINATION WAIST PACK AND BICYCLE LOCKING DEVICE

[76] Inventor: William Sovitski, 1550 Hayden Blvd., Elizabeth, Pa. 15037

[21] Appl. No.: 999,042

[22] Filed: Dec. 29, 1997

[51] Int. Cl.[6] .................................................. A45C 15/00
[52] U.S. Cl. ............................. 224/576; 70/18; 224/665
[58] Field of Search ..................... 224/665, 666, 224/917, 224, 257; 70/31, 51, 58, 284, 18, 233, 286; 24/165 K, 616, 3.13, 31; 223/98; 2/338

[56] References Cited

U.S. PATENT DOCUMENTS

| | | |
|---|---|---|
| 247,507 | 9/1881 | Lynch . |
| 367,996 | 8/1887 | Nathan . |
| 4,261,493 | 4/1981 | Newman ................................ 224/257 |
| 4,912,950 | 4/1990 | Crowie ...................................... 70/58 |
| 4,923,105 | 5/1990 | Snyder ................................... 224/255 |
| 5,177,986 | 1/1993 | Jensen ........................................ 70/18 |
| 5,193,368 | 3/1993 | Ling ........................................... 70/30 |
| 5,397,040 | 3/1995 | Lee . |
| 5,570,824 | 11/1996 | Lyon et al. . |
| 5,669,253 | 9/1997 | Higgins ..................................... 70/18 |

*Primary Examiner*—Allan N. Shoap
*Assistant Examiner*—Maerena W. Brevard
*Attorney, Agent, or Firm*—Kenneth P. McKay, Esq.

[57] ABSTRACT

A waist pack combined with a bicycle locking device. The belt of the waist pack is removable from the waist pack when not being worn and threads through the spokes of a bicycle as a lock. The combination provides for a useful means of carrying the bicycle lock on the person while bicycling. The bicycle lock is convenient to stow and provides a bicycle lock that does not damage the bicycle as it is being carried and while not in use.

6 Claims, 3 Drawing Sheets

COMBINATION WAIST PACK AND BICYCLE LOCKING DEVICE

BACKGROUND OF THE INVENTION

1. Field of the Invention

The present invention, a Combination Waist Pack and Bicycle Locking Device, relates generally to a device which acts as a waist pack having a belt which doubles as a bicycle lock. The belt is removable from the waist pack when not being worn and threads through the spokes and frame of a bicycle as a lock. The combination provides for a useful means of carrying the bicycle lock on the person while bicycling.

2. Description of the Related Art

The prior art in packs is well known and certainly dates back to the earliest days of man when hunters carried articles in the sewn skins and hides of their slain game. Equally well-developed are the belt means which are used to carry these packs, particularly around the waist and as separately supported by shoulder harnesses. Recently, as health and fitness have achieved a high level of attention, many people hike and walk for exercise and relaxation. With that activity goes the need to carry articles and, hence, the contemporary development of a variety of waist packs which now are included in the prior art. Also seen are bicyclists who utilize these packs to carry articles.

Bicycling has been a recreational activity, a sport, and a means of transportation since the late 1800's and inherent in the activity is safeguarding the vehicle when it is not in use, particularly when the bicycle is left in a public place. Bicycle locks are well known and taught in the prior art. Most bicycle locks are carried on the bicycle while not in use. Major disadvantages of bicycle locks includes their lack of portability, weight, and the tendency of bicycle locks to scar and scrape the bicycle as they rattle on the frame or around the seat post, the locations where the locks are most often stowed.

The recent re-development of bicycling as a recreation and sport has driven the cost of bicycles up, making the protection of them very important to the user. Therefore, there is a need for a bicycle lock which is convenient to use and stow while not in use. The present invention satisfies these needs, while providing a useful implement for the user while bicycling.

PRIOR ART

U.S. Pat. No. 5,570,824 (Lyon, et al), dated Nov. 5, 1996, shows a belt pack system having an adjustable length belt attached thereto. The pack is capable of carrying items such as cassette tape player and water bottles, and has various compartments.

U.S. Pat. No. 5,397,040 (Lee), dated Mar. 14, 1995, shows a waist belt having a variety of individual storage compartments within a single fabric pack. Within the pack are accommodated a variety of rigid containers for stowing fishing tackle articles and bait.

U.S. Pat. No. 367,996 (Nathan), dated Aug. 9, 1887, teaches the combination of a belt and a pocket-like purse.

U.S. Pat. No. 318,569 (Lynch), dated May 26, 1885 shows the use of a locking buckle.

SUMMARY OF THE INVENTION

The objective of the present invention is to provide a bicycle lock which is convenient to stow while not in use.

A secondary objective is to provide a bicycle lock which is convenient to the user and readily available for use.

A third objective is to provide a bicycle lock which does not damage the bicycle as it is being carried and while not in use.

A fourth objective is to provide a means for carrying implements and articles which a bicyclist needs while cycling.

A fifth objective is to provide a light-weight bicycle lock.

The present invention satisfies the above needs, and others, by providing a waist pack which has a removable and lockable belt which can be used to secure a bicycle while it is not in use. Besides providing the obvious utility of a waist pack, the present invention thereby provides a means for storing the lock while it is not being used which does not damages the bicycle.

The Combination Waist Pack and Bicycle Locking Device is comprised of a waist pack sub-system and a lock-belt subsystem. The lock-belt subsystem is combined with the waist pack sub-system by weaving the former through a waist band installed in the latter as shall be shown and described herein.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended, and that the invention encompasses such alterations and further modifications in the illustrated device, and such further applications of the principles of the invention illustrated herein, as would normally occur to persons skilled in the art to which the invention relates.

Figure 1:
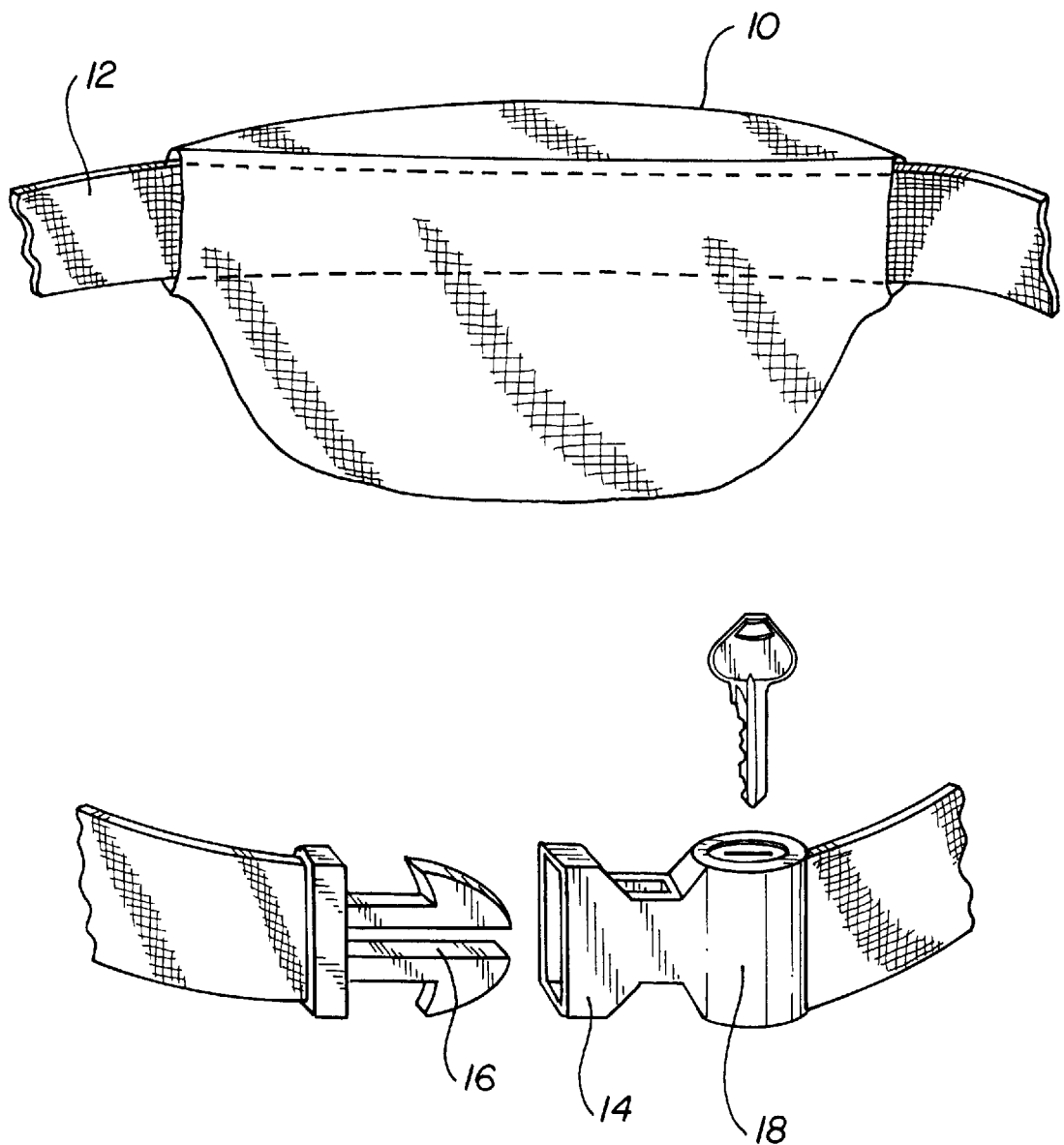
FIG. 1 is a perspective view of the Combination Waist Pack and Bicycle Locking Device showing the constituent elements.

FIG. 1 demonstrates the Combination Waist Pack and Bicycle Locking Device having constituent parts Waist Pack 10 and Belt 12. Belt 12 further includes male end 16 and female end 14 which are combined and then locked shut by lock 18. Inherent within the device shown and claimed are other combinations of accessories which may be held on the Belt 12, but which are removable therefrom to facilitate its use as a lock, for instance, water bottles, flashlights, knives, etc.

Figure 2:
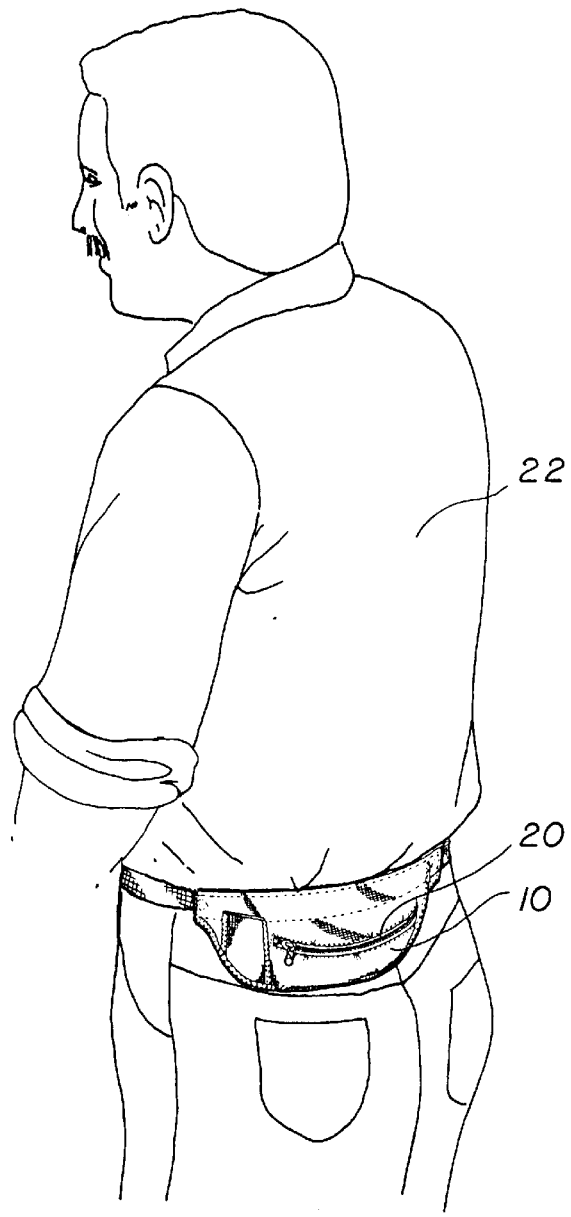
FIG. 2 is a view of the Combination Waist Pack and Bicycle Locking Device in use while being worn on the waist of a person.

FIG. 2. Shows the Combination Waist Pack and Bicycle Locking Device while being worn by user 22. The Belt 12 is worn about the waist with Waist Pack 10 on the small of the back of user 22. Waist Pack 10 has an opening access 20, a zipper as shown. A plurality of such opening accesses may be embodied within the invention. The invention as shown and claimed also includes a larger pack which may be held higher on the back by the addition of suspenders.

Figure 3:
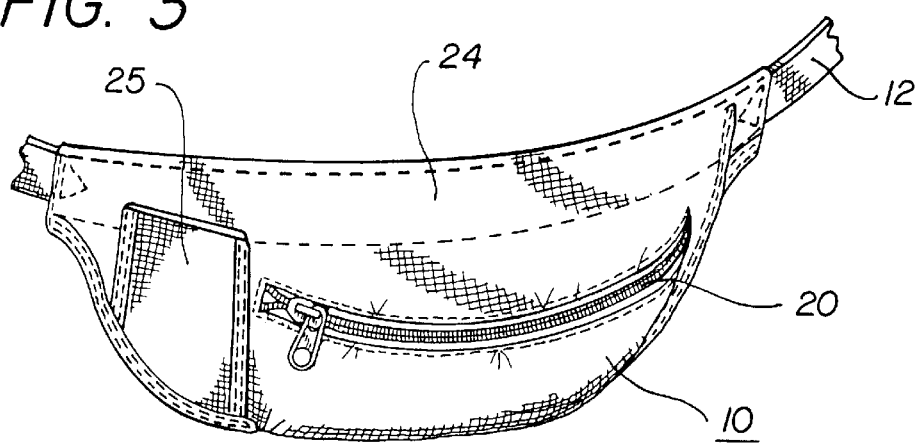
FIG. 3 is a view of the Waist Pack portion of the Combination Waist Pack and Bicycle Locking Device.

FIG. 3 shows the Waist Pack 10 in detail, including the opening access 20, and auxiliary compartment 25, for storing change or the keys to the lock, for instance. Also shown is the band 24 through which the Belt 12 is threaded to hold the Waist Pack 10.

Figure 4:
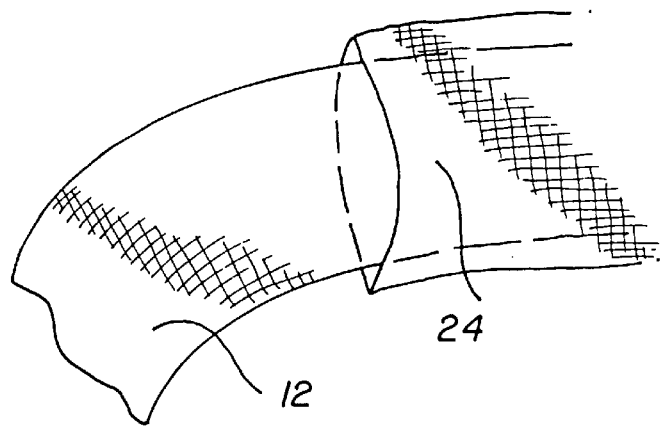
FIG. 4 shows the belt portion of the Combination Waist Pack and Bicycle Locking Device inserted into the band of the Waist Pack.

FIG. 4 demonstrates the Belt 12 installed within the band 24.

Figure 5:
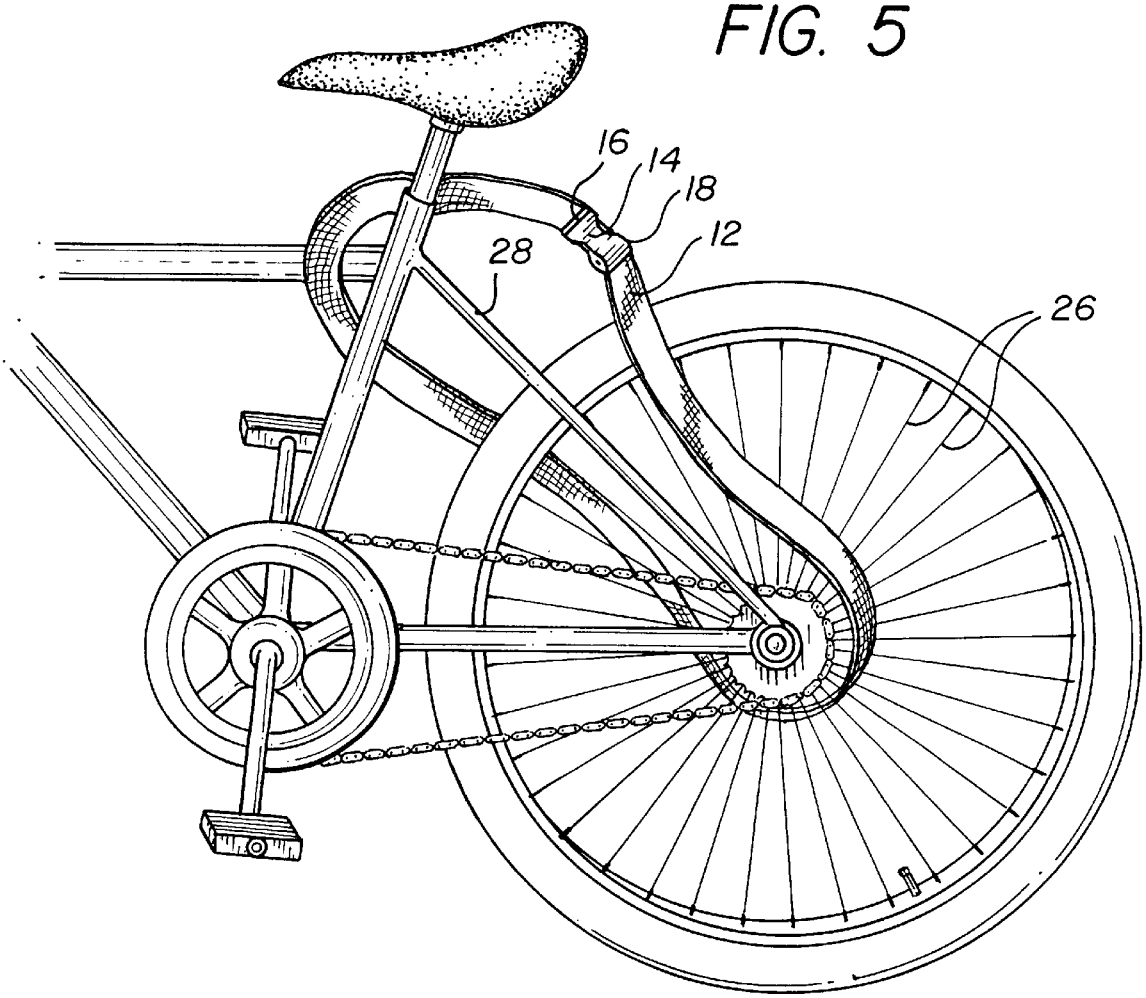
FIG. 5 shows the band having been withdrawn from the Waist Pack and in use as the Bicycle Lock, having been installed around the bicycle spokes and frame.

FIG. 5 shows the belt 12 having been withdrawn and in use as the Bicycle Lock, having been installed around the bicycle spokes 26 and frame 28 and being secured by the mating of male end 16 and female end 14 which are locked shut by lock 18.

The preferred embodiment may be constructed of a variety of materials, vinyl, cloth, canvas, or plastic. A variety of colors may be used. The present invention also incorporates differing sizes of packs with differing arrangements of stowage compartments within the waist pack. The present invention also includes a variety of lock types including, but not limited to, combination locks and key locks.

I claim:

1. A waist pack with a belt for use as a lock when removed from said waist pack and applied through a bicycle wheel and around said bicycle's fork, comprising:

(a) a waist pack which is worn by a user, said waist pack having a plurality of compartments within said waist pack whereby said user carries articles therein and having built into said waist pack a belt band; and, (b) a belt having a length and width and having a male end and a female end, wherein said male end is removably inserted into said female end and fixed therein, and said belt being removably disposed through said belt band, whereby said belt is removable from said belt band and applied through said bicycle wheel and around said bicycle fork as a lock, comprising;

(i) a means for locking said male end into said female end to prevent unauthorized opening; said locking means comprising a cylinder having a longitudinal axis that is parallel with the width of the belt;

(ii) a length which is capable of said belt being used as a bicycle lock; and, (iii) a material of construction which is durable and strong.

2. A waist pack with a removable belt as claimed in claim 1, further comprising a key lock as said means for locking said male end into said female end.

3. A waist pack with a removable belt as claimed in claim 1, further comprising nylon web reinforced with metal as said material of construction.

4. A waist pack with a removable belt as claimed in claim 1, further comprising metal as said material of construction.

5. A waist pack with a removable belt as claimed in claim 1, further comprising metal with a soft rubber coat as said material of construction.

6. A waist pack with a removable belt as claimed in claim 1, further comprising a hard plastic as said material of construction.

* * * * *